United States Patent [19]

Wanderman

[11] 4,095,350

[45] Jun. 20, 1978

[54] DUCTING CONSTRUCTION FOR ENGINEERING DESIGN MODELS

[75] Inventor: Herbert A. Wanderman, Pasadena, Calif.

[73] Assignee: Engineering Model Associates, Inc., Monterey Park, Calif.

[21] Appl. No.: 801,856

[22] Filed: May 31, 1977

[51] Int. Cl.² ............................................. G09B 25/04
[52] U.S. Cl. ........................................... 35/16; 46/24
[58] Field of Search .................. 35/13, 16; 46/24, 25, 46/30, 31

[56] References Cited

U.S. PATENT DOCUMENTS

| | | | |
|---|---|---|---|
| 2,320,292 | 5/1943 | Nelson | 46/25 |
| 3,137,967 | 6/1964 | Flieth | 46/30 X |
| 3,594,922 | 7/1971 | Ellis | 35/16 |
| 3,690,672 | 9/1972 | Dreyer | 46/24 |

*Primary Examiner*—H. S. Skogquist
*Attorney, Agent, or Firm*—Fulwider, Patton, Rieber, Lee & Utecht

[57] ABSTRACT

An engineering design model of a large and complex installation, such as a chemical processing plant or a power generating station, including three-dimensional representations of ducting, beams, piping, valves, fittings, vessels and associated equipment. An assortment of ducting fabrication segments of various sizes and colors are used to form the ducting, each segment being a flat solid member of rectangular outline having longitudinal, step-shaped, nesting configurations extending along its two longest parallel edges. The segments are connected in groups of four with the nesting configurations interlocked to form hollow ducting representations of a large variety of sizes and proportions. Transparent segments can be color coded by marking their edges.

9 Claims, 8 Drawing Figures

U.S. Patent  June 20, 1978  4,095,350
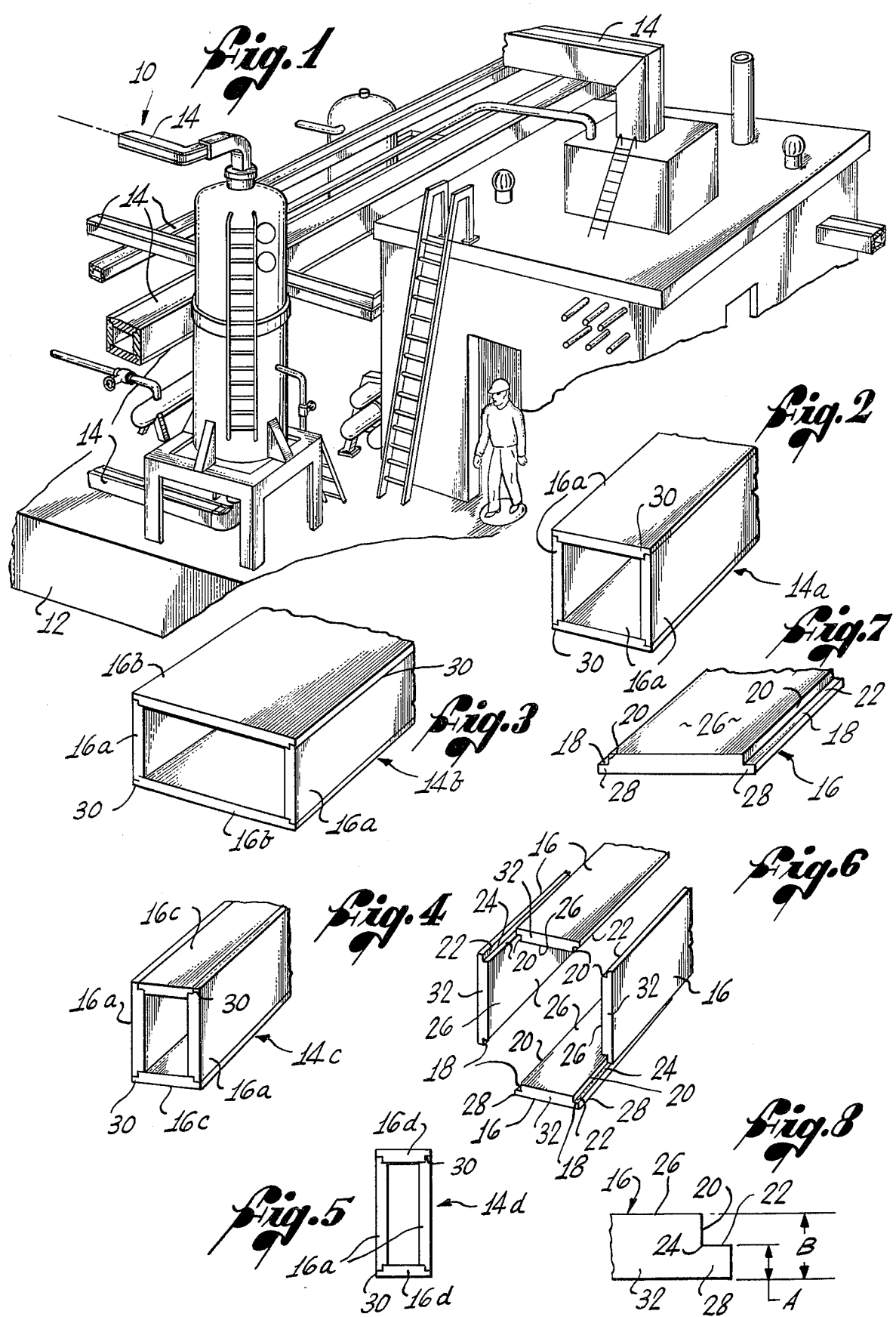

DUCTING CONSTRUCTION FOR ENGINEERING DESIGN MODELS

BACKGROUND OF THE INVENTION

The present invention relates to the fabrication of engineering design models, and more particularly to the construction of a structure for the representation of ducting in such models.

It has become a widely accepted engineering practice to fabricate highly accurate and detailed scale models of large and complex installations, such as chemical processing plants, refineries, and nuclear power generating stations. The use of such models began in the late nineteen forties or early nineteen fifties, the earliest models being relatively crude, formed largely of wood and brass wire. Ultimately, it was realized that more detailed models could provide a highly effective tool for the design of these installations, in many instances replacing, instead of merely supplementing the voluminous drawings that were more conventional. More specifically, the inherent limitations of representing a complex three-dimensional structure on a two-dimensional surface could be escaped by using the models, and the frequently encountered unwelcome discovery on the construction site that structures shown on two different drawings interfered with each other could be eliminated almost completely. It also became apparent that the optimum lay-out of three-dimensionally interrelated ducting and piping can be discovered more easily and quickly by actually designing the installation as the model was built. The proper order of construction could also be determined from the model, and persons who could not visualize the finished installation from the drawings could readily comprehend the model. As the usefulness and cost saving significance of engineering design models has become widely recognized, there has been a continuing demand for more accurate and sophisticated models.

Modern design models are cut into easily managed segments, each supported on a separate table and capable of being moved and re-assembled at the construction site or other location where they are most useful. They are color coded and labeled to aid in understanding the manner in which the installation functions, also utilizing transparent components so that the interior structure is not hidden. Transparent piping and ducting is sometimes color coded by coloring an edge of each segment, the color being transmitted and recognizable throughout.

To meet the need for accuracy of detail in model engineering design models, professional model builders currently maintain inventories of pre-fabricated components including, for example, beams, cross beams, ladders, stairways, boilers, condensers, valves, piping and ducting. Typical heating, ventilating and air conditioning ducting of rectangular cross section imposes especially burdensome inventory requirements because it requires a great variety of sizes, shapes and colors. Ducting also tends to be heavy and therefore expensive because its relatively large cross section consumes excessive quantities of plastic. The cost of injection molding large sizes of ducting is often prohibitive and at times the plastic may not be available.

One proposed solution to the problem of representing ducting has been the use of plastic foam as a construction material. Foam, however, is easily damaged by small quantities of the solvent used to weld joints on the models, and it is difficult to avoid unintended solvent contact. Moreover, foam is relatively porous and therefore cannot be readily painted for labeling or color coding.

SUMMARY OF THE INVENTION

The present invention provides hollow, injection-molded ducting for engineering design models that not only saves plastic and is lighter in weight, but makes ducting of a large variety of sizes, shapes and colors available from a relatively small inventory of component parts. The ducting is constructed form an assortment of ducting fabrication segments. Each segment is a flat, plate-like, solid member of rectangular outline having a longitudinal, step-shaped, nesting configuration extending along each of its two longest parallel edges. The assortment includes segments of various dimensions and colors, and transparent segments may be included as well.

The fabrication of a model utilizing the assortment described above involves connecting the segments in groups of four so that the nesting configurations interlock to form a structure of rectangular cross section. The outer surface of the structure can readily be painted or labeled and is not significantly damaged by small quantities of solvent. All segments of a group are of the same color, and the edges of transparent segments can be colored for coding. Apart from the structure of the ducting, conventional model construction techniques are used.

Other features and advantages of the present invention will become apparent from the following detailed description of a preferred form thereof, and the attached drawings which illustrate, by way of example, the principles of the invention.

BRIEF DESCRIPTION OF THE DRAWINGS

FIG. 1 is a perspective view of a small fragmentary portion of an engineering design model constructed in accordance with the present invention;

FIGS. 2, 3, 4 and 5 are enlarged perspective views of fragmentary end portions of model ducting of various sizes and proportions;

FIG. 6 is an enlarged, exploded view of a fragmentary end portion of the ducting;

FIG. 7 is an enlarged perspective view of a fragmentary end portion of a single ducting fabrication segment; and FIG. 8 is a further enlargement of a fragmentary plane view of a corner of ducting fabrication segment.

DESCRIPTION OF THE PREFERRED EMBODIMENT

The novel aspects of the present invention are embodied in the construction of an exemplary engineering design model 10, a small fragmentary portion of which is shown in FIG. 1. The entire model 10 is a three-dimensional representation of a large and complex installation, such as a chemical processing plant, preferably on a scale of ⅜ in., ½ in., or ¾ in. equals 1 ft.

The model 10 is supported on a base formed by a plurality of adjacent retangular tables 12 with Plexiglas tops. The entire model is severed at the boundaries of the tables 12 and can, therefore, be transported and reassembled at a construction site or any other location where it is needed. Generally, each table 12 should not exceed twenty-nine inches in width and six feet in length, these dimensions being conventional in the art, so that the model will fit through standard hallways and doors.

The model 10 is constructed from pre-fabricated plastic components representing distillation towers, pumps, valves, heat exchangers, condensers, other vessels, beams, bearings, ladders, stairways, piping and ducting. Color coding of the components, particularly the piping and ducting, aids in understanding functional interrelationships.

A large variety of sizes and shapes of heating, ventilating and air conditioning ducting is required for accurate design models. However, the unique structure of the members used to represent this ducting 14 can be fabricated from a relatively small model maker's inventory, while at the same time conserving material and reducing the weight of the model 10.

Each piece of ducting 14 is formed by assembly of four ducting fabricating segments 16 of the same color, arranged to form a box-like structure, as shown in FIGS. 2-5. The individual ducting segments 16, shown in FIG. 7, are flat, solid pieces of injection-molded acrylic plastic that are rectangular in outline. Other plastic materials may be suitable. Longitudinal nesting configurations 18 extend along the two longest parallel edges. Each nesting configuration 18 is formed by two narrow strip-like surfaces 20 and 22 of equal width, perpendicular to the adjoining surfaces of the segment 16, to form an inside corner 24. In cross section, the segment 16 has a step-shaped profile on each side of its inwardly facing surface 26, as shown FIG. 8. The depth "A" of the cut-away portion is equal to one-half the thickness "B" of the segment 16, so that a tab 28 of square cross section remains.

When the segments 16 are assembled to form ducting 14, the nesting configurations 18 interlock, as shown in FIG. 6, with the tabs 28 of one segment received by the inside corner 24 of an adjoining segment, all exterior surfaces being flush. The outer profile of the finished ducting 14 is therefore completely rectangular. Solvent welding can be accomplished easily and quickly along the joints 30.

It will be noted that segments 16a of a particular width can be combined with other segments 16a of equal dimensions to form square ducting 14a, as shown in FIG. 2, or they can be combined with segments 16b of greater width to form rectangular ducting 14b, as shown in FIG. 3. Alternatively, the same segments 16a can be combined with smaller segments 16c or 16d to form smaller rectangular ducting 14c and 14d as shown in FIGS. 4 and 5. Since the ducting 14 is hollow, there is a considerable savings in weight and material and the use of foam can be avoided. The opaque and translucent sgements 14 are provided in a variety of colors for the color coding of the model 10, and labels and paint can be applied to the non-porous exterior surfaces. Transparent ducting 12 can provide a relatively unobstructed view of cmponents of the model 10 that would otherwise be obscured, an advantage which cannot be attained with foam or wood structures. The transparent ducting segments can be color coded by applying paint along any of their side or end edges, and the color is visible throughout the lengths of the segments 16.

While a particular form of the invention has been illustrated and described, it will also be apparent that various modifications can be made without departing from the spirit and scope of the invention.

I claim:

1. A method of fabricating a detailed, three-dimensional engineering design model of a large and complex installation such as a chemical processing plant or a power generating station, including arranging a plurality of rectangular tables adjacent each other to provide a supporting base for the model; positioning three-dimensional plastic representations of ducting, beams, piping, valves, fittings, vessels, and associated equipment on said base in a manner consistent with the positions of corresponding components of the installation; connecting said plastic representations to each other by solvent welding; and cutting said model vertically into rectangular sections suitable for shipping, each section being supported by a different table, wherein the improvement comprises:

providing an assortment of ducting fabrication segments, each of said segments being a flat, solid member of rectangular outline having longitudinal, step-shaped, nesting configurations extending along its two longest parallel edges, said assortment including segments of various colors and dimensions; and connecting segments selected from said assortment by solvent welding in groups of four so that said nesting configurations interlock to form representations of said ducting, all members of each of said groups being the same color.

2. The method of claim 1, further comprising the steps of providing transparent segments as part of said assortment and assembling groups of said transparent segments to form transparent ducting.

3. The method of claim 2, further comprising the steps of marking the edges of said transparent ducting with selected colors to color code said transparent ducting.

4. An engineering design model of a large and complex installation such as a chemical processing plant or a power generating station including color-coded representations of heating, ventilating and air conditioning ducting, each of said representations comprising four flat, solid ducting fabrication segments of rectangular outline made of injection-molded acrylic plastic, and having longitudinal, step-shaped, nesting configurations extending along its two longest parallel edges, said segments being interlocked and solvent-welded to form a hollow structure of rectangular outline.

5. The engineering design model of claim 4, wherein said segments are transparent.

6. The engineering design model of claim 5, wherein said segments are color coded on at least one edge thereof.

7. For use in representing ducting in an engineering design model of a complex installation such as a chemical processing plant or a power generating station, an assortment of ducting segments for forming elongated hollow structures having rectangular cross sections of a variety of predetermined sizes and proportions, each of said segments comprising a flat solid member made of injection molded acrylic plastic having step-shaped, longitudinal, nesting configurations forming inside corners extending along each of its two longest parallel edges, whereby said segments can be interlocked and attached by solvent welding, said assortment including segments of various dimensions and colors.

8. The assortment of ducting segments of claim 7, further comprising transparent ducting segments.

9. The assortment of ducting segments of claim 8 wherein at least some of said transparent ducting segments are color coded on one edge thereof.

* * * * *